(12) United States Patent
Boychuk

(10) Patent No.: US 10,549,573 B2
(45) Date of Patent: Feb. 4, 2020

(54) DECORATIVE PANEL SYSTEM

(71) Applicant: Stephen Boychuk, Toronto (CA)

(72) Inventor: Stephen Boychuk, Toronto (CA)

(73) Assignee: ALEX-ANDRITE DESIGN INC., Toronto (CA)

( * ) Notice: Subject to any disclaimer, the term of this patent is extended or adjusted under 35 U.S.C. 154(b) by 428 days.

(21) Appl. No.: 15/253,101

(22) Filed: Aug. 31, 2016

(65) Prior Publication Data

US 2016/0368310 A1  Dec. 22, 2016

Related U.S. Application Data

(63) Continuation-in-part of application No. 14/210,542, filed on Mar. 14, 2014, now abandoned.

(30) Foreign Application Priority Data

Mar. 18, 2013  (CA) .................................. 2810376

(51) Int. Cl.
*B44C 5/04* (2006.01)
*A47B 96/20* (2006.01)

(52) U.S. Cl.
CPC .............. *B44C 5/04* (2013.01); *A47B 96/206* (2013.01); *A47B 2096/207* (2013.01)

(58) Field of Classification Search
CPC .. B44C 5/04; B44C 5/005; B32B 9/00; B32B 9/002; B32B 15/04; B32B 3/04; B32B 21/08; B32B 21/02; B32B 27/308; B32B 2307/546; B32B 2607/00; B32B 2451/00; B32B 2307/414; B32B 2307/412; B32B 2479/00; A47B 2096/207; A47B 96/206
See application file for complete search history.

(56) References Cited

U.S. PATENT DOCUMENTS

| | | | | |
|---|---|---|---|---|
| 2,777,232 | A * | 1/1957 | Kulicke | A47G 1/0611 40/780 |
| 2,798,261 | A * | 7/1957 | Greig | E06B 3/4636 52/800.13 |
| 3,055,722 | A * | 9/1962 | Chase | A47B 13/083 108/27 |

(Continued)

*Primary Examiner* — Jeanette E Chapman
(74) *Attorney, Agent, or Firm* — Ralph E. Jocke; Colin P. Cochran; Walker & Jocke

(57) ABSTRACT

A decorative panel formed from at least a display panel secured to a frame. In some embodiments the panel comprises a transparent or translucent display panel and an interchangeable decorative insert disposed between the display panel and a supporting surface. In other embodiments an opaque display panel acts serves the function of both the display and decorative layers. A retaining frame is disposed about the periphery of the panels and retains the layers in generally abutting relation, the retaining frame being removable so as to permit replacement of the decorative insert or display panel. The retaining frame comprises a return flange disposed forwardly of the supporting surface at the position of the groove, such that the display panel is retained by the flange seated in the groove, generally concealing the retaining frame. The panel system of the invention provides a cost effective means of changing the look of cabinetry and other decorative fixtures that is easy to implement and results in little wastage of materials.

18 Claims, 11 Drawing Sheets

(56) References Cited

U.S. PATENT DOCUMENTS

| | | | | |
|---|---|---|---|---|
| 3,200,526 | A | * | 8/1965 | Munn .................. A47G 1/0611 40/791 |
| 3,425,147 | A | * | 2/1969 | Marx ..................... A47F 11/02 40/757 |
| 3,665,628 | A | * | 5/1972 | Dammond ........... A47G 1/0638 40/792 |
| 3,719,766 | A | * | 3/1973 | Fichtel ................. A47B 97/001 434/430 |
| 3,877,165 | A | * | 4/1975 | Lumbard ............. A47G 1/0611 40/617 |
| 3,883,974 | A | * | 5/1975 | Ashton ................ A47G 1/0605 40/606.18 |
| 4,078,326 | A | * | 3/1978 | Reim .................... A47G 1/162 40/759 |
| 4,107,897 | A | * | 8/1978 | Ullman, Jr. .......... A47G 1/0611 52/717.05 |
| 4,183,160 | A | * | 1/1980 | Brodersen ............ A47G 1/0605 40/718 |
| 4,282,667 | A | * | 8/1981 | Glade .................. A47G 1/0611 40/611.05 |
| 4,722,146 | A | * | 2/1988 | Kemeny ............... E04B 2/7429 160/135 |
| 5,218,798 | A | * | 6/1993 | Bentivegna ........... E04B 1/7069 52/206 |
| 6,928,786 | B2 | * | 8/2005 | Orozco ................ A47B 95/043 52/796.12 |
| 9,758,288 | B2 | * | 9/2017 | Bornstein .............. B65D 81/02 |
| 2015/0296634 | A1 | * | 10/2015 | Itoh ................... G02F 1/133308 361/679.01 |

\* cited by examiner

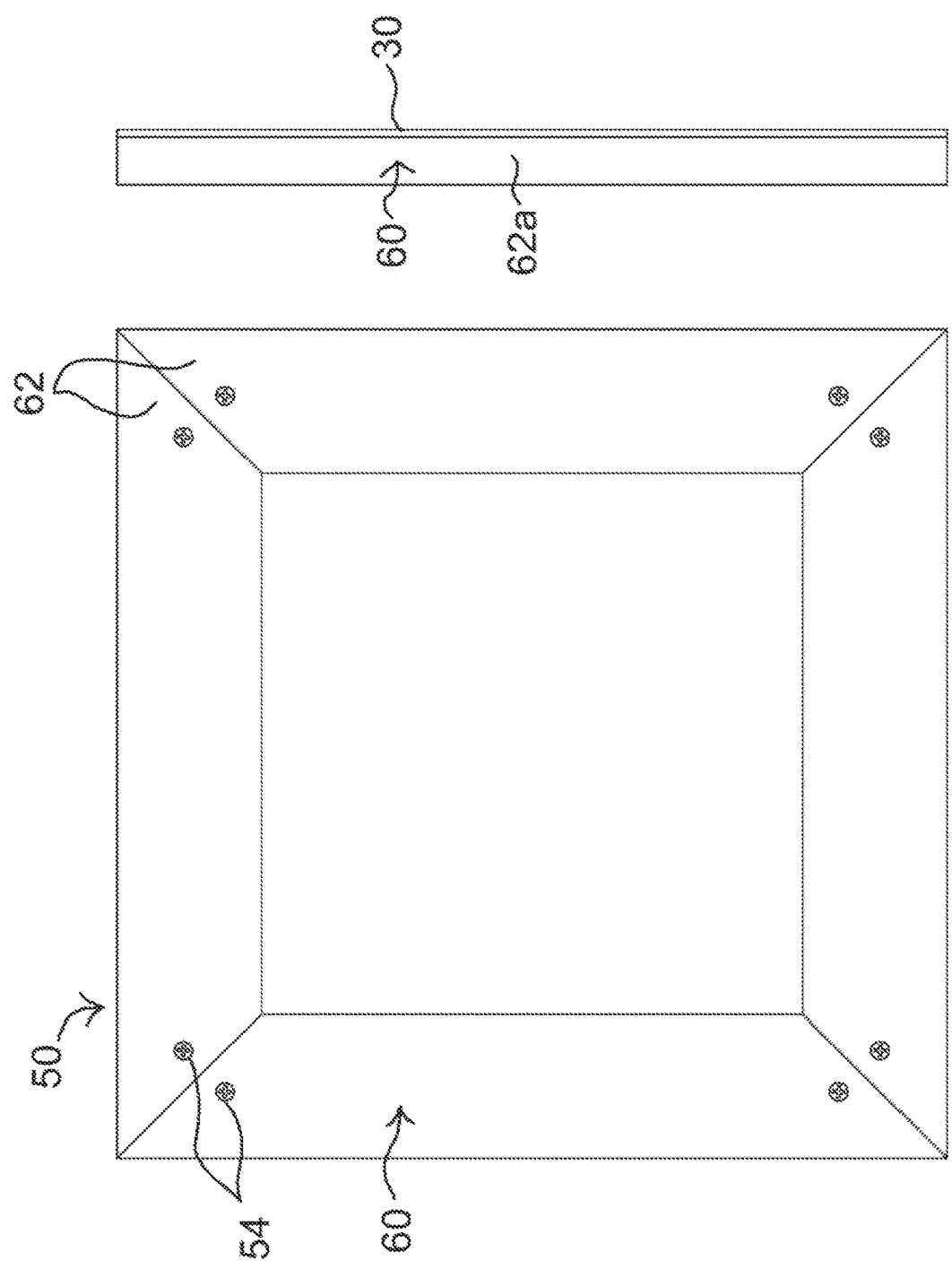

DECORATIVE PANEL SYSTEM

FIELD OF INVENTION

This invention relates to decorative panels for cabinetry and the like.

BACKGROUND OF THE INVENTION

Interior cabinetry, for example kitchen cabinetry, utilizes "facings" including doors and drawers to close the cabinetry and conceal the cabinet or drawer interior. Such facing is often decorative, with myriad different styles and textures to choose from. The selected style and texture creates a 'look' intended to have aesthetic appeal.

There are different types of panels used for this purpose. Solid panels can be made out of materials such as glass, plastic or wood. The main characteristic of this design is that the solid material supports the mounting and handle hardware as well as concealing the area that the panel is designed to cover. The panels are permanently finished in one of a variety of ways. A second type of panel is framed. This type of panel is characterized by a frame made of wood, metal or plastic, which supports the mounting and handle hardware, while the panel fills in the area inside the frame. Other types of panels include modern hybrids where a glass or translucent plastic panel are affixed to a frame or affixed to a solid panel by glues, fasteners or clasps. In all of these cases the frame and panel can be finished in different materials, colors and textures, but with the exception of wood panels, the surface finish of the assembled panel is permanent and unalterable.

Even in the case of wood panels there are limitations on the ability to alter the surface aesthetics. It is unusual in today's age for wood facings to be hand painted. Typically they are pre-formed with a synthetic surface covering such as Masonite (Trademark), which cannot be covered over in any durable fashion; or factory-finished with a stain and/or varnish that is difficult to paint over, requiring extensive labour to remove the existing finish, with attendant costs. Moreover, even where the consumer or commercial user could change the facings using a paint or varnish, for example where the facings have a wood surface, it is virtually impossible to reproduce the surface finish with the same quality as a factory can.

Accordingly, the conventional way of changing the "look" of a kitchen, bathroom, laundry room or other cabinetry-based room is to reface the cabinets. This involves removing the existing facings from cabinet boxes and drawers, and replacing them with new facings. This is relatively expensive, and results in a lot of wasted material because the removed facings (usually custom-fitted to the cabinetry) must typically be discarded.

It would accordingly be advantageous to provide facings for cabinetry that can be aesthetically altered at low cost and with little wasted material.

BRIEF DESCRIPTION OF THE DRAWINGS

In drawings which illustrate embodiments of the invention by way of example only:

FIG. 6 is a front elevational view of a further embodiment of the invention utilizing frame components forming the supporting surface.

FIG. 7 is a side elevational view of the embodiment of FIG. 6.

DETAILED DESCRIPTION OF THE INVENTION

Figure 1:
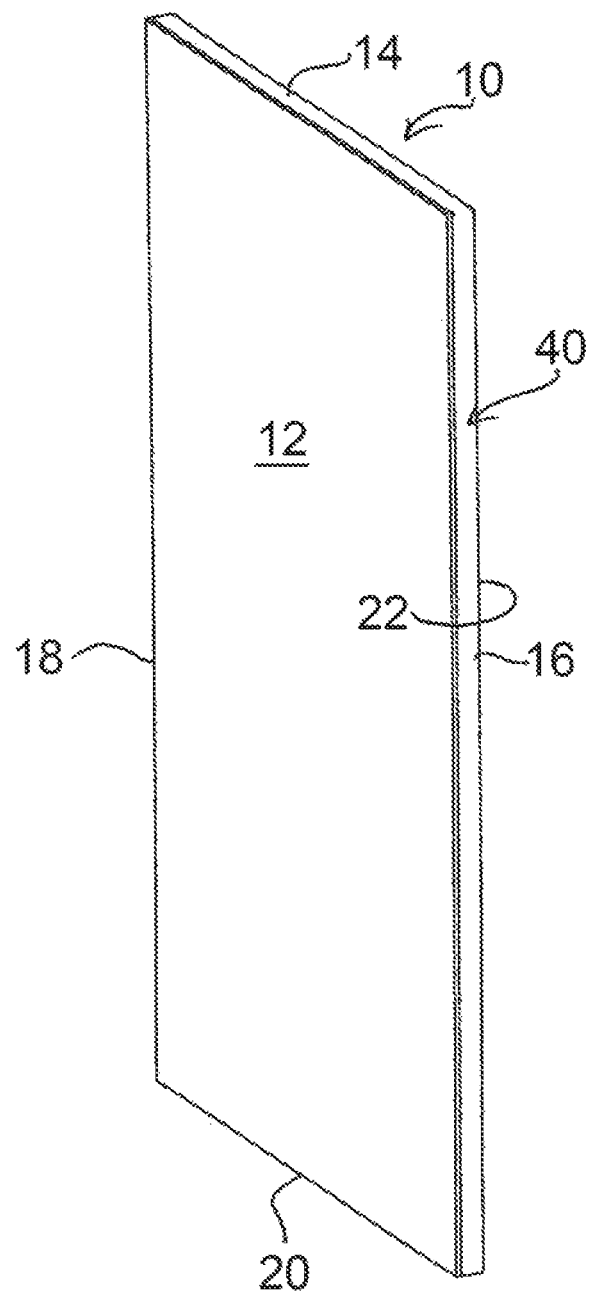
FIG. 1 is a front perspective view of a panel embodying the invention.

While the invention is described below in the environment of cabinetry, it also can be applied to appliance surfaces and other surfaces including partitions, dividers and wall panels.

The dimensions of the panel can be made to meet standard or custom cabinet specifications, and can be manufactured with the cabinetry or supplied as a replacement for existing cabinetry in re-facing situations. Standard mounting and handle hardware can be installed using conventional methods and tools.

In some embodiments the invention provides a decorative panel comprising a transparent or translucent display panel and a decorative insert, and a frame surrounding the periphery of the layers to retain the layers in generally abutting relation, the frame being capable of being removed or disassembled in order to permit replacement of the decorative insert. In some embodiments a supporting layer cooperates with a retaining band to from a frame retaining the decorative insert against the display panel. In other embodiments the decorative insert is supported by a self-contained frame comprising frame components. In these embodiments the invention provides a facing system for cabinetry that can be aesthetically altered at low cost and with little wasted material, requiring replacement solely of a aesthetic insert, which may be relatively thin and therefore of lower cost than replacing an entire door or drawer front. The design of the facing system makes it easy to disassemble and replace a colored or textured insert. The system of the invention is thus ideal for decorative cabinetry. The panel of the invention is particularly especially effective as a drawer front panel or cabinet door for kitchen, bathroom or other decorative cabinets. The invention also provides a method of forming the decorative panel.

In some embodiments the invention provides a display panel combining both display and decorative functions. To change the look of a standard cabinet face, measurements need to be taken for all panel sizes, as well as hinge and handle locations, then a new panel needs to be manufactured complete with all hinge and handle holes. By changing only a single layer serving the function of both the display panel and the decorative insert, all that is required is to cut and profile new display panels and then install on site by disassembling the old panel and interchanging the display panels. The hinges can be left mounted to the back panel or frame (depending on the embodiment), and the handles need only be removed from the old display panel and re-mounted to the new display panel. These embodiments accommodate the use of materials that are naturally opaque rather than transparent or translucent, for example opaque plastics, wood, engineered wood, metal and stone, as the display panel.

The invention thus provides a decorative panel, comprising a retaining frame, and a display panel transversely supported by a supporting surface of the retaining frame, the display panel comprising a groove at least partly surrounding the display panel along perimeter surfaces of the display panel, the retaining frame comprising an outer perimeter face forming a side edge of the frame supporting a return flange disposed substantially parallel with the groove and forwardly of the supporting surface at the position of the groove, the display panel being thereby fixed in position within the assembled frame and replaceable by disassembling at least a portion of the frame to allow the display panel to be inserted into the frame or removed from the frame.

The invention further provides a method of forming a panel, comprising the steps of: a. providing a display panel comprising a groove at least partly surrounding the display panel along a perimeter face of the display panel, b. providing a frame having a supporting surface, the frame supporting a return flange disposed substantially parallel with the groove and forwardly of the supporting surface at the position of the groove, forming a channel, c. inserting the display panel into the channel, and d. affixing the frame around the display panel to retain said display panel, the retaining frame being removable so as to permit replacement of the display panel.

FIGS. 1 to 5 illustrate a first embodiment of a decorative panel 10 according to the invention. The panel 10 comprises a front surface 12, a top edge 14, side edges 16, 18 and a bottom edge 20 defined by a retaining frame 40, and a rear surface 22 opposite the front surface 12. The panel 10 is suitable for mounting to cabinetry, appliances or any other structure in which a decorative surface is desired.

Figure 2:
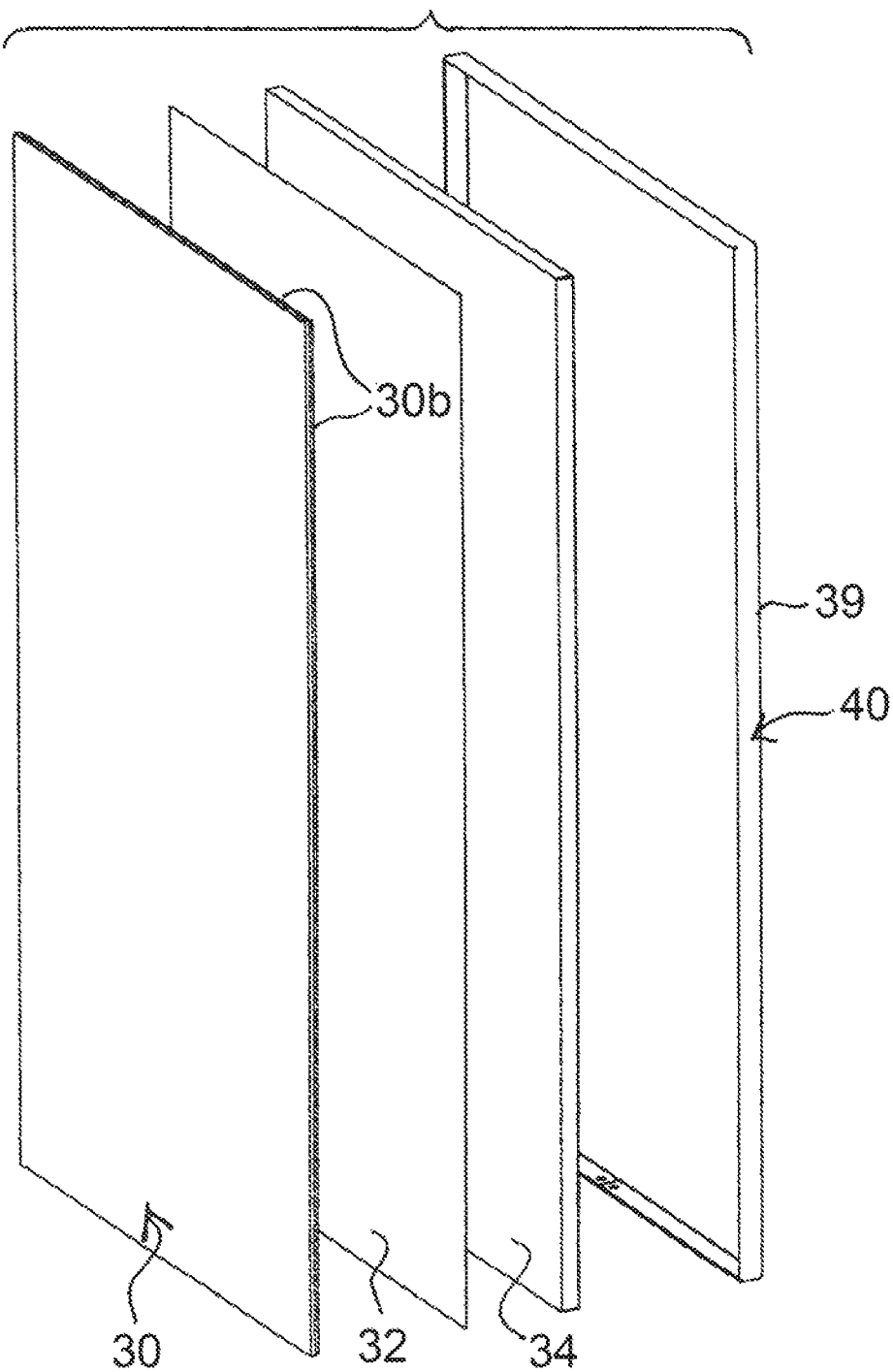
FIG. 2 is an exploded perspective view of the panel of FIG. 1 showing the arrangement of layers in the panel of FIG. 1.
Figure 3:
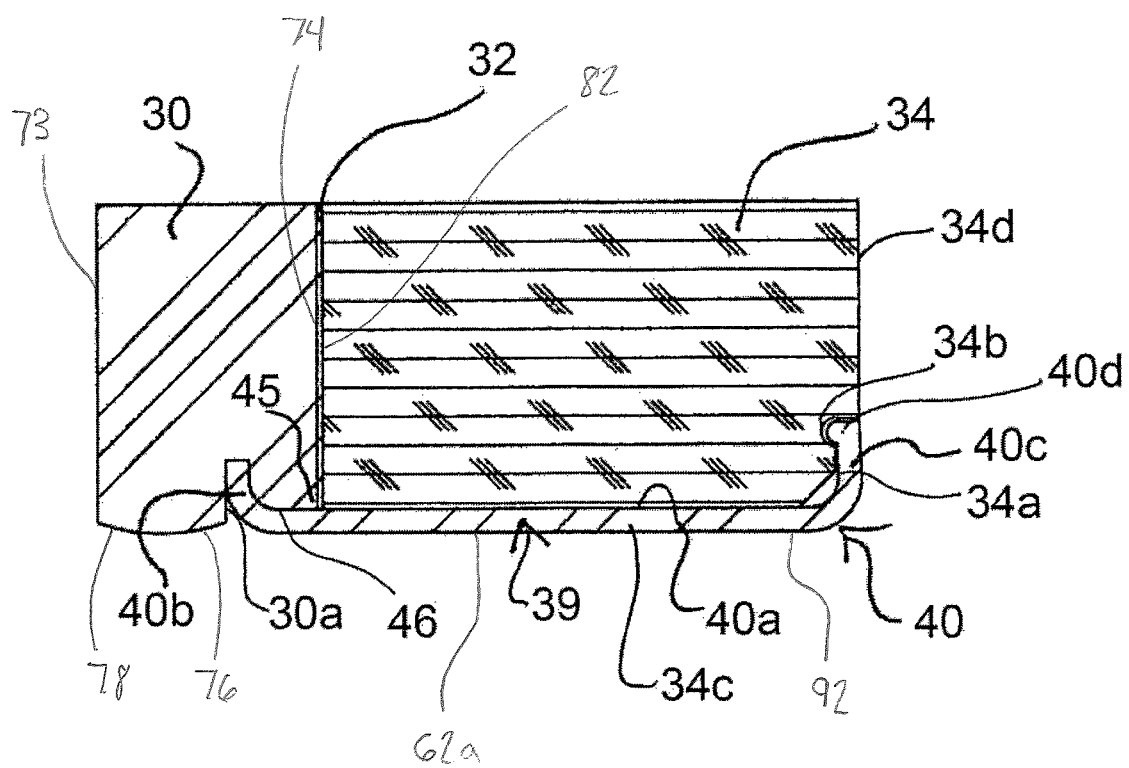
FIG. 3 is a side cross-section of the panel of FIG. 1.

FIG. 2 illustrates the layers of the panel 10 of FIG. 1 in exploded view. The panel 10 comprises a transparent or translucent layer such as a display panel 30, and an interchangeable layer such as decorative insert 32. In this embodiment the panel further comprises a supporting layer such as back panel 34 which together with a retaining band 39, also referred to as a band portion 39, form a retaining frame 40 including a forward support surface 82, for holding the display panel 30 and interchangeable decorative insert 32 together in surface-abutting relation with the forward support surface 82 as an integral unit (as shown in FIG. 3).

In the preferred embodiment the display panel 30 is transparent or translucent, being formed from glass or plastic, allowing light to pass through so that the interchangeable insert 32 is visible behind the display panel 30. The display panel 30 includes a front display panel surface 73, a rear display panel surface 74, a display panel perimeter surface 76, and a display panel perimeter 78. The back panel 34 is preferably rigid and strong enough to support the mounting and handle hardware, composed for example from medium density fibreboard (MDF) or another low cost material. The back panel can alternatively be made of a frame and panel combination. This would be used for either large panels where weight is a concern or for doors/drawers where a more elegant aesthetic is desired. The back panel 34 includes a back panel front surface 84, a back panel rear surface 86, a back panel perimeter surface 88, and a back panel perimeter 90 The interchangeable insert 32, which provides the decorative finish in the assembled panel 10, is held in abutting relation between the front display panel 30 and the back panel 34.

In this embodiment these components are held together by a removable retaining band 39 forming a shallow channel 45 having a floor 40a and flange portion 40b, upturned rear portion 40c, which together with back panel 34 forms a retaining frame 40 with a retaining frame perimeter 92 that bounds the decorative panel 10. The retaining frame 40 includes a retaining frame perimeter surface 62a. The retaining band 39 may be formed (for example stamped or extruded) from aluminum, sheet steel, plastic or any other suitable material. The retaining band 39 and the back panel 34 thus operate together to form a supporting frame 40 for supporting the interchangeable insert 32 in abutting relation with the front display panel 30.

Figure 4:
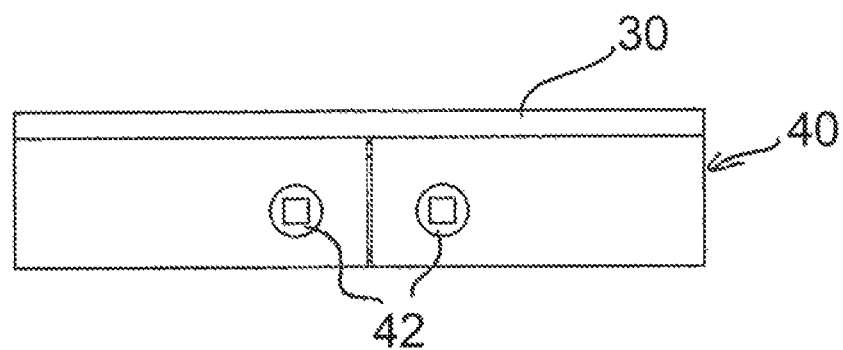
FIG. 4 is a plan view of an edge of the panel of FIG. 1 showing one manner of closing the retaining band.

The retaining band 39 is preferably formed as one piece, and can be opened and closed to allow for easy assembly and disassembly of the panel 10. The ends of the retaining band 39 are butted up against one another and the retaining band 39 may thus be held in the closed position with a fastener affixing each end of the retaining band 39 to the back panel 34, as shown in FIG. 4. In the case of larger panels, the retaining band 39 may be made of two or more portions (not shown), with a fastener at each end affixing the portion of the retaining band 39 to the back panel 34 in abutting relation such that the retaining frame 40 can be disassembled when it is desired to change the replaceable decorative insert 32. The fasteners 42 are preferably positioned along the retaining frame 40 so as to be hidden from sight from a normal viewing position. For example, the fasteners may be wood screws that are countersunk and located along an edge of the panel that is difficult to see, such as the top edge of an upper cupboard door or the bottom edge of a drawer face.

One side 40a of the channel 45 engages into a groove 30a surrounding (or partly surrounding) the perimeter edge faces 30b of the display panel 30, i.e. the faces about the periphery of and orthogonal to the large faces of the panel 30. In the preferred embodiment the portion of the display panel 30 which sits in the channel 45 is recessed, as shown at 46 in FIG. 3, so that the retaining band 39 (and thus the retaining frame 40) is flush with or slightly inset from the bottom edge of the display panel 30. The retaining frame 40 is thus largely concealed from view when observed from the front of the panel 10. The other side 40c of the channel 45 rests in a notch 34b surrounding (or partly surrounding) the back panel 34 near the perimeter of the back panel 34, preferably (but not necessarily) along its rear surface. With the notch 34b disposed along the rear face 34d of the back panel 34, the portion of the back panel 34 between the notch 34b and the perimeter edge face 34c is also preferably recessed from the rear face 34d of the back panel 34 such that the exterior face of the retaining frame 40 is flush with the rear face of the back panel 34. Thus, in the embodiment illustrated the back panel 34 and interchangeable insert 32 are slightly smaller in dimension than the front surface of the display panel 30. This generally conceals the side 40b of the channel 45, for aesthetic purposes, but also avoids the collection of dirt and grime, or the seepage of liquids that may spill or spray onto the front surface of panel 10 into the channel 45 of the retaining frame 40, which is particularly advantageous in a kitchen or bathroom.

The visible exterior surfaces of the retaining band 39 are preferably decorative also, since at least some of these surfaces are visible when the panel 10 (for example a cabinet door or drawer face) is in the open position. The interchangeable insert 32 preferably (but not necessarily) fills the entire available area within the retaining band 39, to thus overlay the entirety of the back panel 34.

The length of the side 40c of the retaining band 39, which extends about the rear face of the back panel 34, is formed as necessary so as to not interfere with door hinge hardware, but is large enough to securely grip the back panel 34 and may have a slight acute angle so that the flexible retaining band 39 can compensate for different thicknesses of insert or manufacturing tolerances. The side 40b the retaining band 39 is preferably made as small as possible so as not to interfere with direct visibility of the interchangeable insert 32, while being large enough to hold the display panel 30 securely in position. The sides 40b, 40c of the retaining band 39 may be mitered or rounded at the corners so as to allow the retaining band 39 to close around the panel 10.

To form the panel 10, an interchangeable insert 32 of the appropriate size is positioned between a display panel 30 and a back panel 34. The retaining band 39 is placed around the periphery of the composite panel arrangement, such that the side 40b sits in the groove 30a and the side 40c sits in the notch 34a. In the preferred embodiment a bead 40d formed along the rear side of the retaining band 39 seats in a complementary groove 34b formed at the end of the notch 34a, either continuously or intermittently around the periphery of the panel 10. In the embodiment shown, when the retaining band 39 is disposed over the edge of the panel 10 the bead 40d is lodged in the groove 34b so as to prevent the retaining band 39 from dislodging along the direction of the plane containing the panel 10, which is optional but provides a more secure attachment to the assembled panel 10.

The retaining frame 40 is fastened to the panel 10, and simultaneously into the closed position, by fasteners 42 disposed through the projecting tongues 43 and into the side edge faces of the back panel 34. The panel 10 assembled in this manner can be mounted to a drawer, cabinet box or other structure in conventional fashion, the hinges being affixed to the back panel 34.

To change the decor of the panel, the fasteners 42 are removed to open the retaining band 39, removing the side 40b from the groove 30a around the perimeter of the display panel 30 and the side 40c from the notch 34a about the back panel 34, and thus releasing the display panel 30 from the back panel 34. The panel 10 can then be reassembled, as described above, with a different decorative insert 32 disposed between the display panel 30 and the back panel 34.

For a different effect to the decor, and to entirely hide side 40b from the front view of the panel, it is possible in this embodiment to combine the display panel 30 and decorative insert 32 into a single decorative opaque panel (not shown). For example, this avoids the need to take measurements for panel sizes, hinge and handle locations. By changing only a single layer serving the function of both the display panel and the decorative insert, all that is required is to cut and profile new display panels and then install on site by disassembling the old panel and interchanging the display panels. This saves considerable time in installation and manufacturing.

Figure 5:
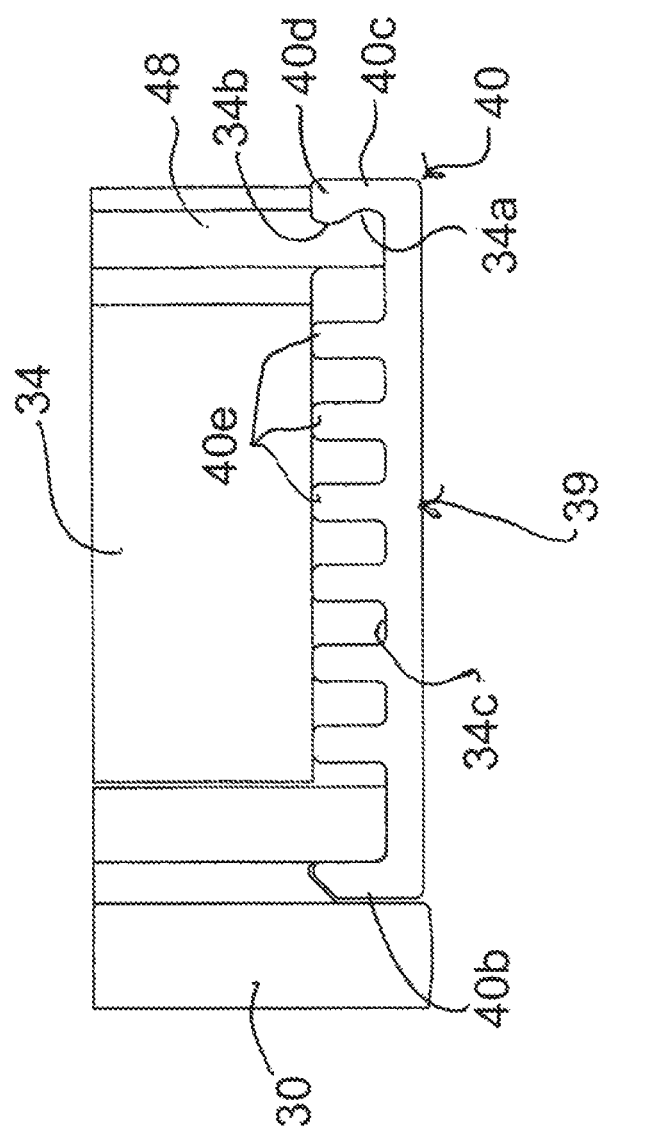
FIG. 5 is a cross-section of a further embodiment of the retaining band.

FIG. 5 illustrates a further embodiment of the retaining band 39 having ribs 40e which aid in straight forming the retaining band 39 through an extrusion die. In this embodiment the back panel 34 comprises an overlay 48, for example formed from transparent, translucent or opaque acrylic sheet. The overlay may be laminated to the wood portion of the back panel 34 as illustrated, or may be held in position against the wood portion of the back panel 34 by the retaining band 39, which would allow a further decorative insert panel (not shown) to be mounted between the wood portion of the back panel 34 and the acrylic overlay 48, for example to impart a decorative finish to the back of a cupboard door. In this embodiment the notch 34a and groove 34b are formed in the acrylic portion 48 of the back panel 34.

In a further embodiment of the invention illustrated in FIGS. 6 to 10, a decorative panel 50 is formed from a display panel 30 and an interchangeable decorative insert 32. The display panel 30 and decorative insert 32 may be as described in the previous embodiment. In the embodiment of FIGS. 6 to 10 the supporting frame holding the interchangeable insert 32 in abutting relation between the front display panel 30 the display panel 30 comprises a retaining frame 60, which also holds the decorative insert 32 against the display panel 30, so that a back panel (34 in the embodiment of FIGS. 1 to 5) is not required. In a cupboard door utilizing this embodiment, the hinges (not shown) are mounted between the cabinet box (not shown) and the frame 60.

Figure 10:
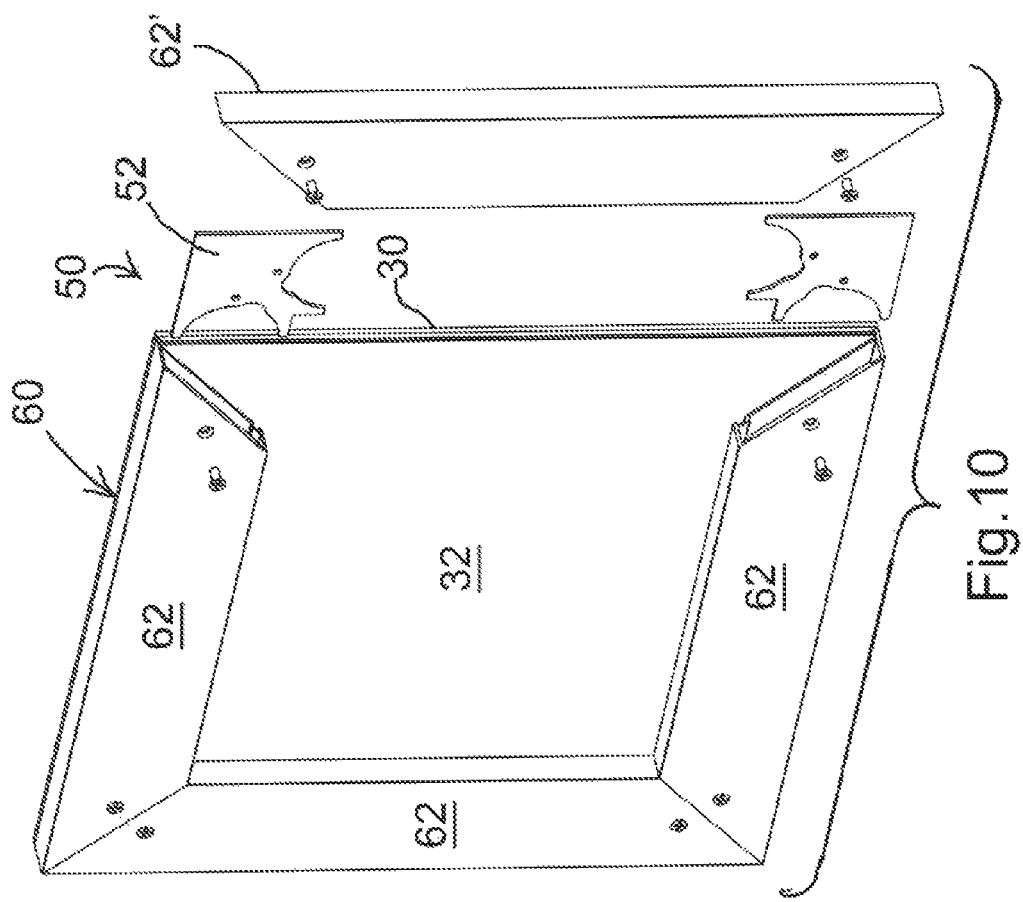
FIG. 10 is a rear perspective view of the panel of FIG. 6 showing the manner of assembling or disassembling the frame to replace the interchangeable insert.
Figure 9:
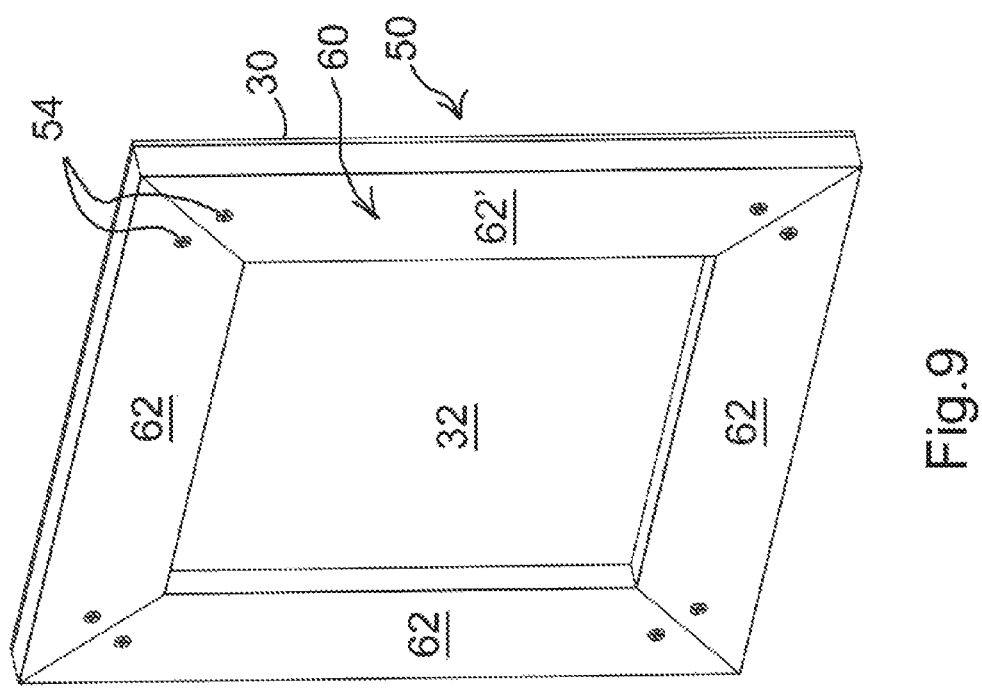
FIG. 9 is a rear perspective view of the panel of FIG. 6.

The retaining frame 60 in this embodiment may be composed of frame components 62 each having the length necessary to create a panel 50 of the required size. In the embodiment shown each frame component 62 is formed from an extrusion, for example of metal (such as aluminum), plastic or another suitable material. The frame components 62 may be affixed together in any suitable fashion, for example by corner key brackets 52 as shown, so that at least one component 62 can be removed from the frame for access to the interchangeable insert 32. In the embodiment shown set screws 54 disposed through complementary threaded openings in the rear face 65 of the frame 50 are tightened to bear against the corner brackets 52 to maintain the frame 60 in an assembled condition. The set screws 54 at each end of a frame component 62 are loosened to release the respective corner brackets 52 and allow the frame component 62 to be removed from the assembled frame 60, as shown in FIG. 10.

Figure 8:
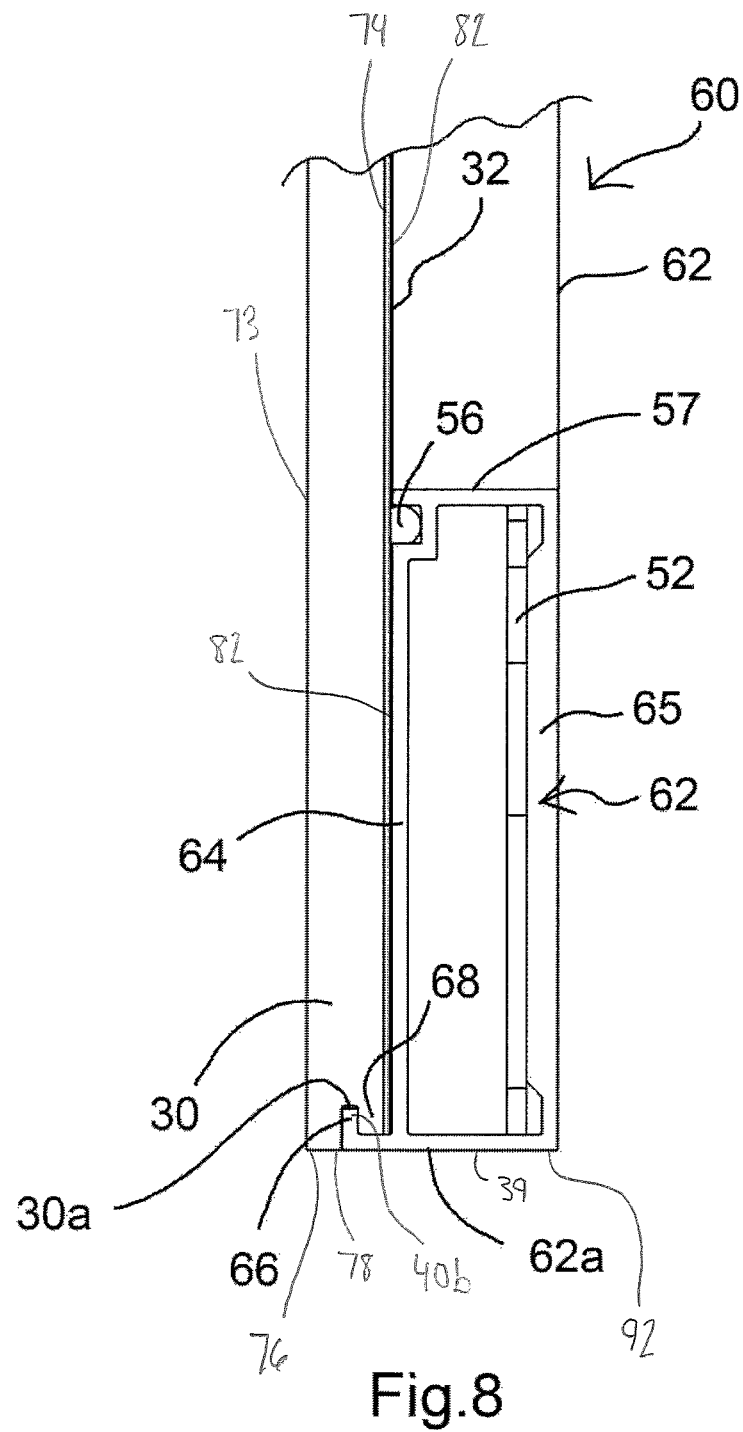
FIG. 8 is an enlarged cross-sectional elevation of a corner of the frame in the embodiment of FIG. 6.

Each frame component 62 comprises a front bearing wall 64 having a return flange 66 along (or partially along) its outer perimeter face 62a, best seen in FIG. 8. The return flange 66 is spaced from the bearing wall 64 to form a channel 68. The return flange 66 engages into the groove 30a surrounding (or partly surrounding) the perimeter edge faces 30b of the display panel 30. As in the previous embodiment, the portion of the display panel 30 that sits in the channel 68 may be recessed so that the frame 60 is flush with the bottom edge of the display panel 30 as shown (or slightly inset from the bottom edge of the display panel 30, not shown). The frame 60 is thereby largely concealed from view when observed from the front of the panel 10. As in the embodiment of FIGS. 1 to 5, in the embodiment illustrated in FIGS. 6 to 10 the interchangeable insert 32 is slightly smaller in dimension than the front surface of the display panel 30 and the perimeter edge of the interchangeable insert 32 thus sits in the channel 68 with the recessed portion of the display panel 30.

The bearing wall 64 may comprise a gasket 56, for example adjacent to internal face 57 of the frame component 62, against which the display panel 30 presses the interchangeable insert 32, which both prevents rattling of the display panel 30 against the bearing wall 64 and helps to fix the insert 32 in position.

To form the panel 50, the display layer 30 is placed face down on surface. The decorative insert 32 is placed on top of the display layer 30 (if not already adhered to the display layer 30). The frame components 62 are positioned around the display layer 30, such that the display panel 30 forms the front face of the panel 50 as shown in FIG. 10, inserting corner brackets 52 loosely into the frame components 62. The frame components 62 are moved toward each other so that flanges 66 fit into grooves 30a. When the return flange 66 of the remaining frame component 62' seats in the exposed groove 30a, the mitered corners of the remaining frame component 62' abut the mitered corners of the assembled frame components 62. The set screws 54 are then installed and tightened to secure the frame 60.

In the case of a door embodying the panel 50 of FIGS. 6 to 10, the hinges (not shown) may be conventional cabinet hinges and may be mounted to the rear surface of the frame 60 and the cabinet boxes in conventional fashion. The handle (not shown) can be removed from the panel 50 and re-attached to the panel 50 after the new decorative insert 32 has been mounted, or a new handle can be mounted through the new display panel 50.

Figure 11:
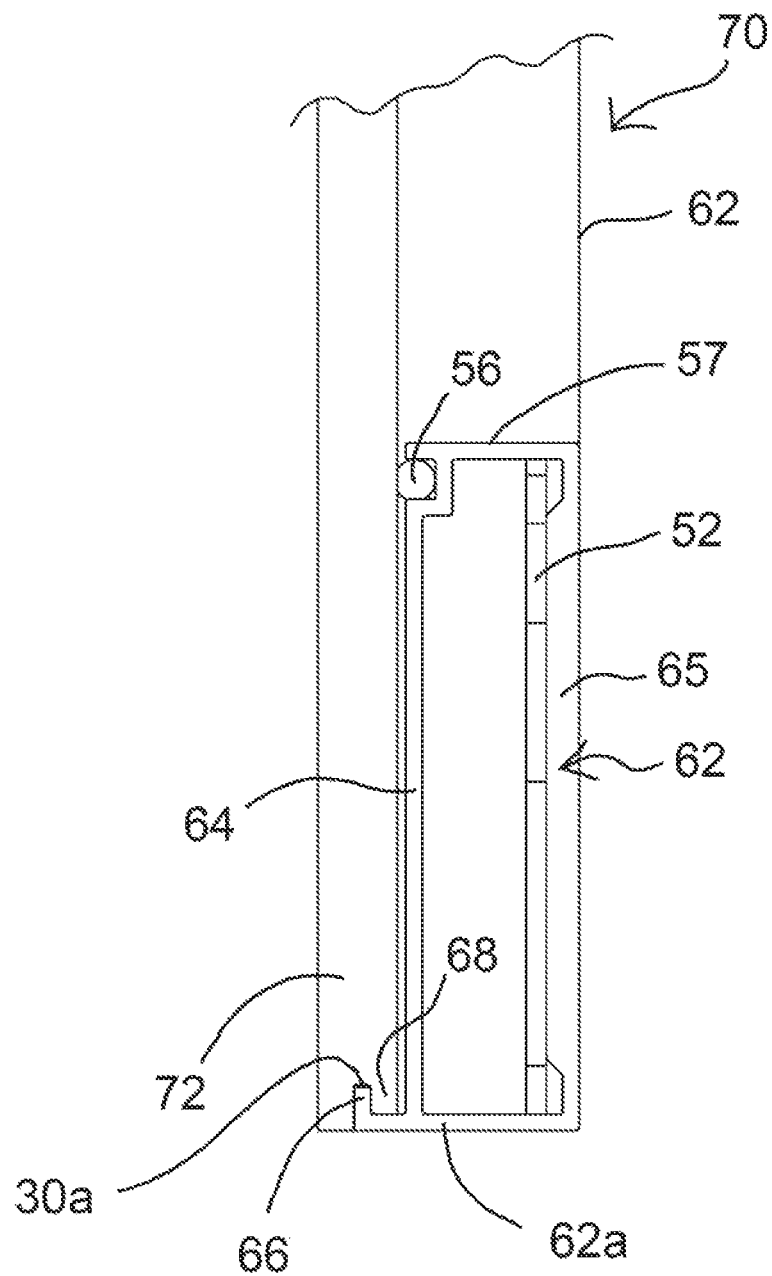
FIG. 11 is an enlarged cross-sectional elevation of a corner of a further embodiment of the invention utilizing the frame of FIG. 6.

A further embodiment of the invention, illustrated in FIG. 11, provides a panel 70 comprising a single layer forming a display panel 72, combining both display and decorative functions, along with the frame 60 of the embodiment of FIGS. 6 to 10. The embodiment of FIG. 11 may be employed with rigid opaque materials such as (without limitation) plastic, wood, metal or stone as the display panel 72. The groove 66 (and optionally the recessed portion of the perimeter edge surface) can be routed or milled into the perimeter surfaces of the display panel 72.

Thus, to replace the display panel 72 in a door with a display panel 72 of a different decor, the door is removed from the cabinet box (in many cases the hinges can be split by a quick-release) and the frame 60 is disassembled as previously described. The display panel 72 is removed by reversing the assembly procedure described above and the new display panel 72 is mounted by reassembling the frame 60 as described above.

In the case of a door embodying the panel 70 of FIG. 11, the hinges (not shown) may be conventional cabinet hinges and may be mounted to the rear surface of the frame 60 and the cabinet boxes in conventional fashion. The handle (not shown) can be removed from the panel 70 and re-attached to the panel 70 after the new display panel 72 has been mounted, or a new handle can be mounted through the new display panel 72.

Figure 12:
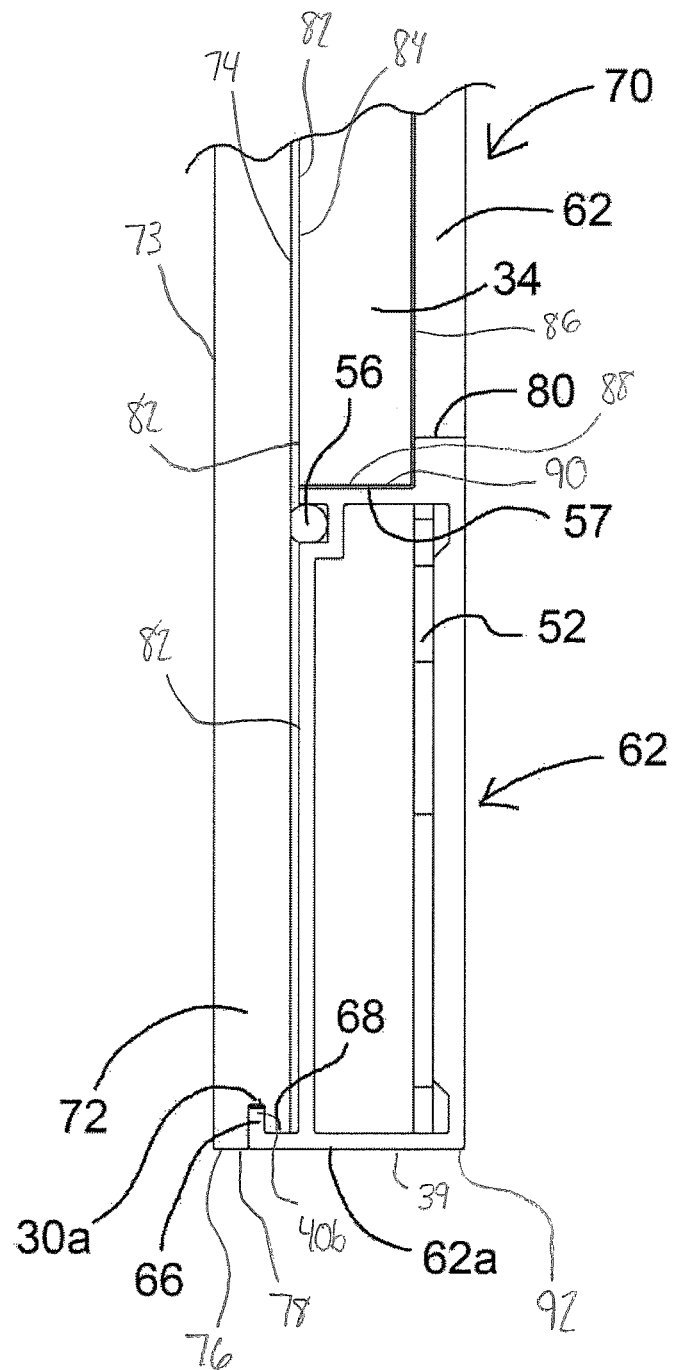
FIG. 12 is an enlarged cross-sectional elevation of a corner of a still further embodiment of the invention utilizing a modification of the frame of FIG. 6.

FIG. 12 illustrates a further embodiment in which the display panel 72 also forms the decorative insert. In this embodiment the frame components 62 are provided with an inner ridge 80 for retaining a rigid back panel 34 against the display panel 72, to resist flexing and 'billowing' of the centre portion of the display panel 72. In this embodiment the composition of the back panel 34 may be as described in the embodiment of FIGS. 1 to 5 and is dimensioned to fit within the internal face 57 of the frame 60 and the ridge 80. The ridge 80 at least partly surrounds the inner portion of the frame 60, to retain the back panel 34 in snug abutting relation to the display panel 72. If the frame components 62 are formed as extruded components the ridge 80 would circumscribe the internal faces 57 of the frame components 62.

Figure 13:
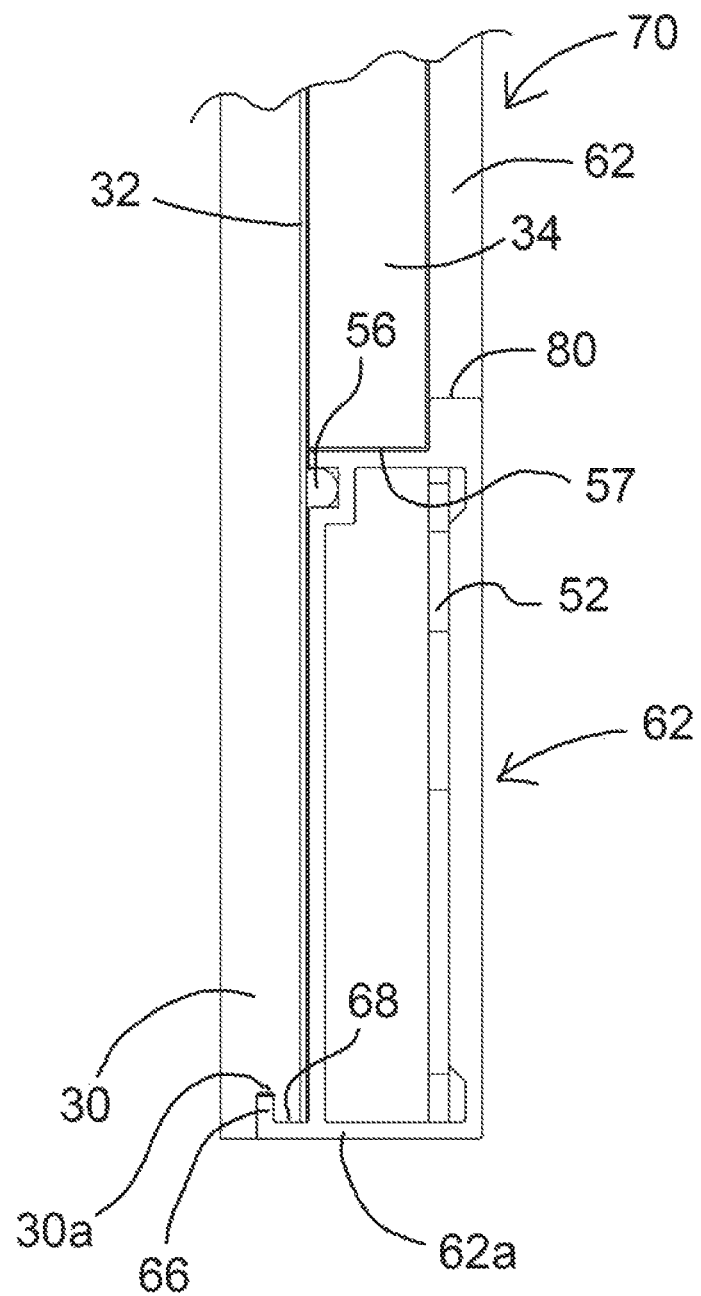
FIG. 13 is an enlarged cross-sectional elevation of a corner of a still further embodiment of the invention utilizing the frame of FIG. 12.

FIG. 13 illustrates a further embodiment of the panel 70 having a transparent or translucent display panel 30, as in the embodiment is FIGS. 1 to 5, and a decorative insert 32 is disposed between the display panel 30 and the back panel 34, visible through the display panel 30 from the front of the panel 70. The back panel 34 resists flexing and billowing of the centre portion of the decorative insert 32 and holds the decorative insert 32 in position.

If the decorative insert 32 is particularly thin and unable to be self-supporting, for example a film, it may be removably laminated or otherwise adhered to the display panel 30 before the display panel 30 is inserted into the frame 40 or 60 to ensure that the decorative insert 32 remains in position without sagging or creasing. In this case the decorative insert 32 is replaced by removing the display panel 30 as described above and peeling the decorative insert off of the display panel 30. If the new decorative insert 32 is similarly too thin to be self-supporting, it can be adhered to the display panel 30 in like fashion before the display panel is reinserted 30 into the frame 60. If a thicker decorative insert 32 is used to replace the previous decorative insert 32, a thinner display panel 30 can be used to accommodate the greater thickness of the decorative insert 32 within the channel 45 or 68.

Modifications of the invention may be made without departing from the scope of the invention described herein. For example, without limitation, the decorative insert may be adhered to the back panel or the display panel; other layers, partial layers and hybrid layers may be added or substituted for the layers illustrated (for example a decorative insert may be applied to or fixed within the frame overlaying the rear surface of the back panel); or the display panel may be provided with a colour and/or texture to complement or add design elements to the decorative insert layer. The invention includes all such modifications and adaptations as fall within the scope of the accompanying claims.

I claim:

1. A decorative panel, comprising:
a retaining frame, and a display panel transversely supported by a supporting surface of the retaining frame,
the display panel comprising
a groove in, and at least partly surrounding the display panel, along perimeter surfaces of the display panel that are orthogonal to front and rear surfaces of the display panel,
the retaining frame comprising
an outer perimeter face forming a side edge of the frame supporting a return flange disposed substantially parallel with the groove and forwardly of the supporting surface at the position of the groove,
the display panel being thereby fixed in position within the assembled frame with a portion of the display panel in fixed position outside of the assembled frame, and the display panel is replaceable by disassembling at least a portion of the frame to allow the display panel to be inserted into the frame or removed from the frame.

2. The panel of claim 1 further comprising
a back panel,
wherein the retaining frame comprises a unitary, channel-shaped band which is sufficiently flexible as to close around the panel and open to be removed from the panel, the supporting surface being provided by a front face of the back panel.

3. The panel of claim 2
wherein a rear side of the channel rests in a transverse notch in and at least partly surrounding a periphery of the rear face of the supporting surface.

4. The panel of claim 2
wherein the display panel is transparent or translucent, further comprising a decorative insert disposed between the display panel and the supporting surface of the retaining frame, the decorative insert being visible through the front surface of the display panel.

5. The panel of claim 1 wherein the retaining frame comprises retaining frame components each comprising
front bearing surface generally parallel to a rear surface,
a perimeter face and
an internal face,
the supporting surface being provided by the front bearing surfaces of the frame components.

6. The panel of claim 5 wherein a portion of the display panel which sits in the channel is recessed such that the perimeter face of the retaining frame is flush with or inset from the perimeter surface of the display panel.

7. The panel of claim 6 wherein the display panel is transparent or translucent, further comprising
a decorative insert disposed between the display panel and the supporting surface of the retaining frame.

8. The panel of claim 7 wherein the frame components comprise a ridge projecting from the internal face parallel to the frame, the ridge providing a supporting surface for a back panel.

9. The panel of claim 5 comprising a gasket disposed along the supporting surface for bearing against the decorative insert.

10. A kit of parts for producing the panel of claim 1.

11. The panel of claim 1 for use as a cupboard door or drawer front.

12. An apparatus comprising:
a rectangular decorative panel, wherein the decorative panel includes
a display panel, wherein the display panel includes
a front display panel surface, a rear display panel surface, and a display panel perimeter surface,
wherein the front display panel surface extends parallel to the rear display panel surface, and
wherein the display panel perimeter surface bounds the display panel and extends transversely between the front display panel surface and the rear display panel surface about a display panel perimeter,
wherein the display panel perimeter surface includes a groove,
wherein the groove extends inwardly in the display panel perimeter surface transversely intermediate of and parallel to the front and rear display panel surfaces, and
wherein the groove extends around at least part of the display panel perimeter,
a retaining frame, wherein the retaining frame includes
a forward support surface, an opposed rear surface, and a retaining frame perimeter surface,
wherein the forward support surface and the opposed rear surface extend parallel to the front display panel surface and the retaining frame perimeter surface bounds the retaining frame and extends transversely between the forward support surface and the rear surface about a retaining frame perimeter,
a band portion,
wherein the band portion includes the retaining frame perimeter surface and extends continuously about the retaining frame perimeter,
wherein the band portion extends transversely outward of the forward support surface, and wherein the band portion includes a flange portion, wherein the band portion terminates outwardly of the forward support surface in the flange portion,
wherein the flange portion extends parallel to the front and rear display panel surfaces and extends within the groove, and wherein the flange portion extends around at least part of the display panel perimeter that includes the groove,
wherein when the flange portion extends in the groove, the band portion outwardly overlies in abutting engagement only a portion of the display panel perimeter surface that is disposed inwardly of the flange portion toward the forward support surface, and wherein the display panel is held in fixed engagement within the retaining frame.

13. The apparatus according to claim 12 wherein the display panel is at least one of transparent or translucent, and
wherein the apparatus further includes
a decorative insert, wherein the decorative insert is disposed between the rear display panel surface and the retaining frame support surface,
whereby the decorative insert is visible through the display panel.

14. The apparatus according to claim 13 wherein the retaining frame rear surface includes a notch,
wherein the notch transversely extends across at least part of the retaining frame rear surface between opposed sides of the retaining frame perimeter in close adjacent proximity to the retaining frame perimeter, and wherein the notch is recessed toward and in parallel relation with the retaining frame support surface,
wherein the band portion extends transversely outward of the notch, and wherein the band portion includes an upturned rear portion, wherein the band portion terminates outwardly of the notch in the upturned rear portion,
wherein the upturned rear portion extends parallel to the forward support surface and the retaining frame rear surface and extends in and is in abutting engagement with the notch, wherein the upturned rear portion extends around at least part of the retaining frame rear surface that includes the notch,
wherein when the upturned rear portion extends in the notch and the flange portion extends in the groove, the band portion is at least one of inset from or flush with the retaining frame rear surface to cause the band portion not to extend outward relative to the retaining frame rear surface, beyond the retaining frame rear surface.

15. The apparatus according to claim 13 wherein the band portion is sufficiently flexible to operatively close around at least part of the display panel and to be removable from the display panel, wherein the display panel is removable by disassembling at least a portion of the retaining frame.

16. The apparatus according to claim 14 wherein the portion of the display panel perimeter surface that is disposed inwardly of the flange portion toward the forward support surface is recessed toward the opposing side of the display panel perimeter,
wherein when the flange portion extends in the groove and the upturned rear portion extends in the notch, the band portion is at least one of inset from or flush with the display panel perimeter surface to cause the band portion not to extend outward relative to the display panel perimeter surface, beyond the display panel perimeter surface.

17. The apparatus according to claim 13
wherein the retaining frame further includes
a plurality of frame components, wherein each of the frame components is in operative releasable engagement with each of the immediately adjacent other frame components,
wherein each of the plurality of frame components includes
a front bearing wall, wherein the front bearing wall extends parallel to the retaining frame rear surface,
wherein the front bearing wall includes at least part of the retaining frame forward support surface, and wherein the front bearing wall further includes a gasket,
wherein the gasket is in operative connection with the front bearing wall and at least part of the gasket extends forwardly of the retaining frame forward support surface, beyond the retaining frame forward support surface, and wherein the gasket is operative to cause the decorative insert to be forcibly pressed against the rear display panel surface.

18. The apparatus according to claim 17
wherein the retaining frame further includes a back panel,
wherein the back panel includes a back panel front surface, a back panel rear surface, and a back panel perimeter surface,
wherein the back panel front surface extends parallel to the back panel rear surface and the display panel rear surface,
wherein the back panel perimeter surface bounds the back panel and extends transversely between the back panel front surface and the back panel rear surface about a back panel perimeter,
wherein each of the plurality of frame components further includes
an internal face and an inner ridge,
wherein the internal face is in operative connection with the front bearing wall at an upper end of the front bearing wall, and wherein the internal face extends perpendicular to the front bearing wall and parallel to the retaining frame perimeter surface toward the retaining frame rear surface, and
wherein the inner ridge is in operative connection with the retaining frame rear surface above the internal face, and wherein the inner ridge extends parallel to the internal face toward the front bearing wall, wherein the internal face and the inner ridge do not overlap,
wherein the back panel perimeter surface is in fixed position above and in parallel abutting engagement with the internal face, and wherein the back panel rear surface is in perpendicular abutting engagement with and forwardly of the inner ridge,
wherein the inner ridge is operative to support the back panel rear surface forwardly of the retaining frame rear surface, and wherein the back panel front surface is in a vertically flush extending alignment with the front bearing wall,
whereby the back panel front surface and the front bearing wall form the forward support surface of the retaining frame.

\* \* \* \* \*